United States Patent [19]

Sistare

[11] 4,311,063
[45] Jan. 19, 1982

[54] BEARING AND BEARING MOUNT AND TOOLS INCORPORATING SAME

[75] Inventor: James R. Sistare, Pickens, S.C.

[73] Assignee: The Singer Company, Stamford, Conn.

[21] Appl. No.: 155,704

[22] Filed: Jun. 2, 1980

[51] Int. Cl.³ .................... F16H 35/06; F16H 35/08
[52] U.S. Cl. ........................................ 74/395; 74/406
[58] Field of Search ................. 173/162; 74/417, 406, 74/409, 395, 402–423, 398

[56] References Cited

U.S. PATENT DOCUMENTS

| 797,354 | 8/1905 | Goodsell | 74/402 |
|---|---|---|---|
| 3,667,310 | 6/1972 | Hahner | 74/417 |
| 3,817,115 | 6/1974 | Schnizler et al. | 74/417 |

Primary Examiner—Ronald Feldbaum
Attorney, Agent, or Firm—Robert E. Smith; Elliot A. Lackenbach; Edward L. Bell

[57] ABSTRACT

A bearing and bearing mount comprising an adjustable combined sleeve and thrust bearing which may be adjusted during assembly for endwise positioning which is of generally top-hat configuration having a generally cylindrical sleeve bearing portion and a generally laterally outwardly extending annular rim-like portion providing a thrust bearing face generally perpendicular the axis of the sleeve bearing portion, the rear face of the rim-like portion being provided with a cam or ramp surface which rises progressively relative the front or thrust bearing face in a direction generally parallel the longitudinal axis of the sleeve bearing portion together with a saddle strap having a semi-cylindrical central portion adapted to engage the sleeve bearing portion and so fit against the sleeve portion of the bearing as to prevent it from rotating therewithin and provided with a cam or ramp surface that mates with and is adapted to engage the cam or ramp surface of the combined sleeve and thrust bearing so that relative rotation of the bearing beneath the strap will provide a camming action so as to move the bearing and, therefore, the thrust face thereof longitudinally relative the mounting strap and right-angle sander/polisher incorporating same.

11 Claims, 2 Drawing Figures

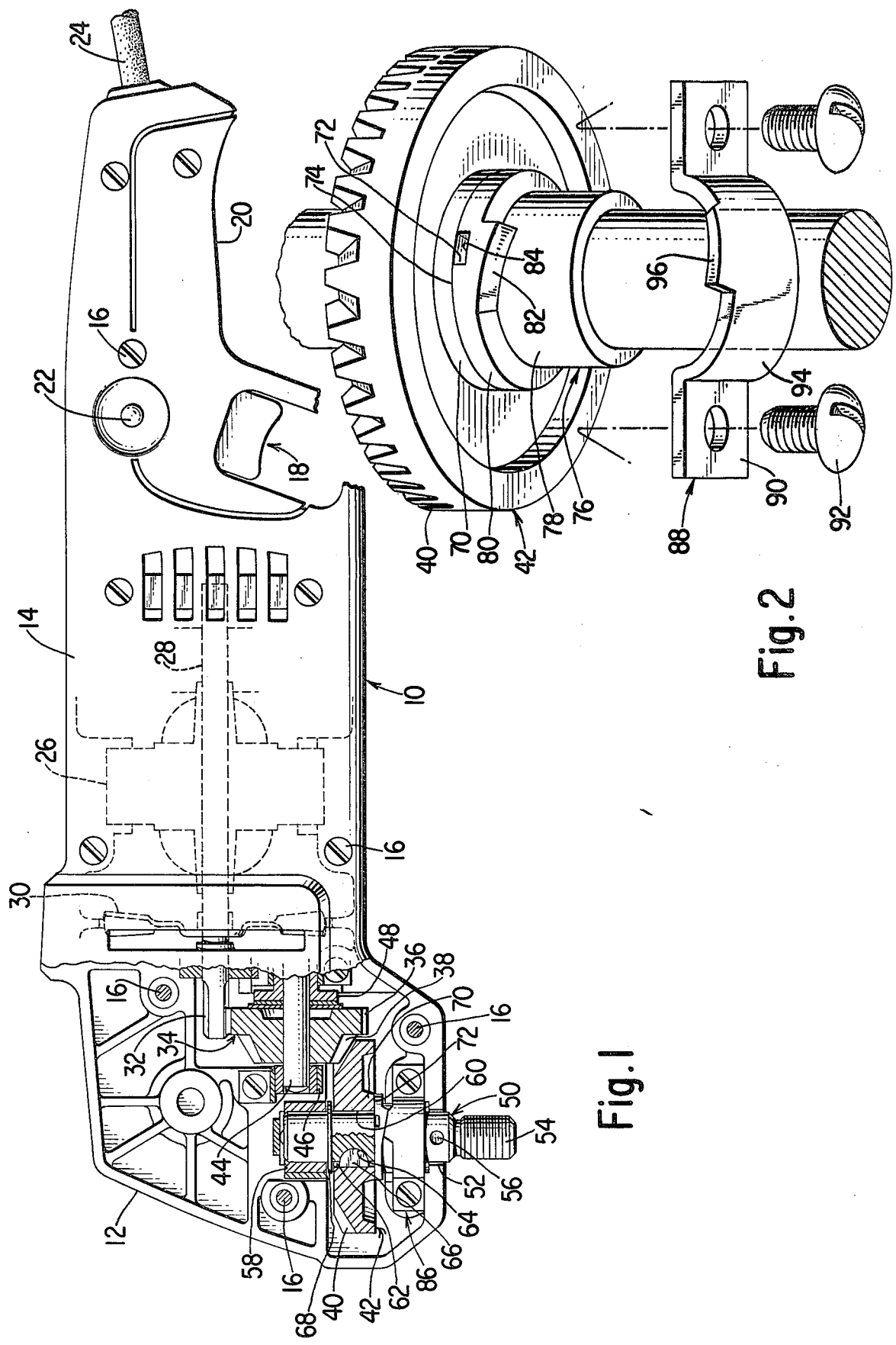

BEARING AND BEARING MOUNT AND TOOLS INCORPORATING SAME

DESCRIPTION

1. Field of the Invention

This invention relates to a bearing and bearing mount and, more particularly, to a mount arrangement for a combined sleeve and thrust bearing which is adjustable in its endwise position during assembly which finds particular utility in connection with a beveled ring gear in the output drive of a right-angle sander/polisher such as is utilized in automotive maintenance.

2. Background of the Invention

Right-angle sander/polishers are often used in connection with automotive maintenance together with buffing or polishing heads or bonnets for applying, buffing and polishing wax or similar finishes, or with abrasive heads or discs for example, removing paint, grinding repair materials, removing rust, and the like. Right-angle grinders and sander/polishers are so designated because they comprise a generally elongated body having a hand grip at one end thereof, a generally centrally disposed motor having an armature shaft extending generally longitudinally of the longitudinal axis of the tool and an output shaft disposed generally at a right angle thereto. An auxiliary handle may also be removably associated with the gear case end. Affixed to the output shaft there may be provided a rubber or similar elastomeric pad to which there may be affixed a sanding or polishing pad or, for sanding and grinding, an abrasive disc. Between the motor armature shaft and the output shaft is a reduction gear set contained within the gear case end to enable the output shaft to be rotated at, for example, 1700/1900 revolutions per minute to provide a maximum SFPM of the pad of less than or about equal to 3000 SFPM. In the right-angle sander/polisher specifically disclosed herein and illustrated in the drawing, a double-reduction gear set is included which comprises mating beveled pinion and ring gears providing one stage of gear reduction driven from the motor armature shaft through a second gear reduction stage.

It is desirable to provide means for enabling the clearance or back-lash between the pinion and output ring gear to be adjusted during assembly of the tool so that during assembly compensation may be made for variances in manufacturing tolerances. With proper adjustment, gear noise and whine can be minimized.

SUMMARY OF THE INVENTION

In accordance with the present invention, a bearing and bearing mount is provided which provides an adjustable combined sleeve and thrust bearing which may be adjusted during assembly for endwise positioning which, when used in conjuction with a shaft and beveled ring gear carried thereby may be utilized to provide for adjustment of the gear in its mating relationship with an associated beveled pinion gear to provide smooth, quiet, and long life operation.

A combined sleeve and thrust bearing is provided which is of generally top-hat configuration comprising a generally cylindrical sleeve bearing portion and a generally laterally outwardly extending annular rim-like portion providing a thrust bearing face generally perpendicular the axis of the sleeve bearing portion which may, in accordance with one aspect of the present invention, bear against a mating face of the hub of a beveled ring gear to provide axial positioning thereof.

Referring to the thrust face or surface of the rim-like portion as the "front" face, the rear face of the rim-like portion, in accordance with the present invention, is provided with a cam or ramp surface which rises progressively relative the front or thrust bearing face in a direction generally parallel the longitudinal axis of the sleeve bearing portion. Further, the rim portion of the combined sleeve and thrust bearing is provided with at least one generally radially extending slot to enable engagement thereof, as by a spanner wrench for rotational positioning.

In accordance with the present invention, a bearing mount is provided connected with the housing of, for example, a right-angle sander/polisher for supporting the combined sleeve and thrust bearing. Such mount may comprise a semi-cylindrical seat within the housing half of a clam-shell housing for receiving the sleeve portion of the combined thrust and sleeve bearing with the combined thrust and sleeve bearing being retained in position thereon and therein by a saddle strap having a pair of generally opposed coplanar ears adapted to be attached to the housing half adjacent opposite sides of the semi-circular seat, as by means of mounting screws and with a semi-cylindrical central portion therebetween adapted to engage the sleeve bearing portion generally opposite the semi-cylindrical seat and to form therewith a generally cylindrical mounting for the sleeve bearing portion. Upon tightening of the mounting screws, the strap should so fit against the sleeve portion of the bearing as to prevent it from rotating therewithin.

The generally semi-cylindrical portion of the saddle strap is provided with a cam or ramp surface that mates with and is adapted to engage the cam or ramp surface of the combined sleeve and thrust bearing so that relative rotation of the bearing beneath the strip will provide a camming action so as to move the bearing and, therefore, the thrust face thereof longitudinally relative the mounting strap and associated housing half seat.

During assembly, a spanner wrench and appropriate tooling such as a pressure gauge or feeler gauge may be utilized to provide the desired positioning of the beveled ring gear relative the mating beveled pinion gear and, when properly positioned, tightening of the saddle strap is then effective to lock the bearing in its desired orientation.

OBJECTS OF THE INVENTION

Bearing in mind the foregoing, it is a primary object of the present invention to provide novel and improved bearings and bearing mounts, especially for combined sleeve and thrust bearings having, for example, a sleeve portion of generally cylindrical hollow configuration and a thrust portion at one end thereof of generally annular configuration having a generally flat thrust face generally perpendicular the axis of the sleeve bearing portion which may, in accordance with the present invention be generally longitudinally adjusted.

Another primary object of the present invention, in addition to the foregoing object, is the provision of such bearings and bearing mounts which find special utility in connection with assemblies such as portable power tools, for example, a right-angle sander/polisher having a beveled ring gear associated with the output shaft and engaged with a beveled pinion gear so that adjustment of the combined sleeve and thrust bearing effectuates adjustment of the meshing therebetween to minimize noise and wear.

Yet another primary object of the present invention, in addition to each of the foregoing objects, is the provision of such bearings and bearing mounts, especially for use with such a ring gear having a thrust face on the hub thereof slidingly mounted on the output shaft so that adjustment of the bearing within the bearing mount in accordance with the present invention may provide a desired pre-load or clearance to the ring gear.

Still another primary object of the present invention, in addition to each of the foregoing objects, is the provision within such bearings and bearing mounts of mating, cooperating ramp surfaces to enable the bearing to be longitudinally adjusted relative the bearing mount during assembly so as to position the thrust face at a desired position.

Yet another primary object of the present invention, in addition to each of the foregoing objects, is the provision of such bearings and bearing mounts wherein the bearing is further provided with at least one generally radially extending slot so as to enable engagement thereof by a spanner wrench, or the like, for rotationally adjusting the bearing relative the bearing mount so that the cooperating ramp surfaces adjust the bearing's endwise position.

Yet still another primary object of the present invention, in addition to each of the foregoing objects, is the provision of such bearings and bearing mounts in combination with bevel gear drives of an output shaft of, for example, a portable electric power tool such as a right-angle sander/polisher wherein the bevel gear is slidable on the output shaft, as being keyed thereto, and is provided with a hub having a thrust surface so engagement by the thrust face of the bearing to provide adjustment thereby of its meshing with a mating drive pinion gear, whereby, during assembly the mesh pre-load or clearance can be adjusted quickly, easily and inexpensively.

Another and yet further primary object of the present invention, in addition to each of the foregoing objects, is the provision of such bearings and bearing mounts which are inexpensive to manufacture and assemble but which are yet durable and effective in use.

The invention resides in the combination, construction, arrangement and disposition of various component parts and elements incorporated in improved bearings and bearing mounts and in improved portable electric tools such as right-angle sander/polishers incorporating the same constructed in accordance with the principles of this invention. The present invention will be better understood and objects and important features other than those specifically enumerated above will become apparent when consideration is given to the following detailed description, which when taken in conjunction with the annexed drawing describes, discloses, illustrates and shows a preferred embodiment or modification of the present invention and what is presently considered and believed to the best mode of practicing the principles thereof. Other embodiments or modifications may be suggested to those having the benefit of the teachings herein, and such other embodiments or modifications are intended to be reserved, especially as they fall within the scope and spirit of the subjoined claims.

DESCRIPTION OF THE DRAWINGS

While the specification concludes with claims particularly pointing out and distinctly claiming the subject matter which is regarded as forming the present invention, it is believed the invention will be better understood from the following detailed description when taken in conjunction with the annexed drawing wherein like reference characters are used for similar parts throughout the various views and which discloses, illustrates and shows a preferred embodiment or modification of the present invention and what is presently considered and believed to be the best mode of practicing the principles thereof and wherein:

FIG. 1 is a side elevational view of a right-angle sander/polisher, with the housing being partially broken away and with a portion of the gear train being shown in section, illustrating the improved bearing and bearing mount of the present invention, and FIG. 2 is an exploded view of a portion of the output shaft, output bevel or ring gear, bearing and bearing mount, enlarged and with the bearing mount partially rotated as indicated, of the right-angle sander/polisher of FIG. 1.

DETAILED DESCRIPTION OF THE INVENTION

With reference now to the drawing, there is shown and illustrated a right-angle sander/polisher designated generally by the reference character 10 which comprises two housing halves 12 and 14 of clam shell construction held together by a plurality of fastening screws 16. The sander/polisher 10 further comprises a trigger switch designated generally by the reference character 18 adjacent a hand grip portion 20 and there is also provided a lock button 22 for cooperation with the trigger switch mechanism 18. Yet still further a line cord 24 is provided for powering the tool and mounted within the clam shell housing halves 12 and 14 there is provided an electric motor shown in broken lines and designated generally by the reference character 26 and which includes an armature shaft 28 which carries a cooling fan 30 and has formed at one end portion thereof gear teeth 32 defining the input of a double reduction gear set which comprises the gear teeth 32, and output beveled ring gear 42 and an intermediate gear 34 having spur gear teeth 36 in meshing engagement with the armature shaft gear teeth 32 and driving pinion bevel gear teeth 38 in meshing engagement with the gear teeth 40 of the output bevel ring gear 42. The intermediate gear 34 is mounted on a gear shaft 44 carried in bearings 46 and 48 carried by the clam shell housing halves 12 and 14.

As heretofore pointed out, the output gear 42 is mounted for rotation with an output shaft 50 which extends through a hole 52 provided in the mating housing halves 12 and 14. The end portion of the output shaft outward of the housing halves 12 and 14 may be provided with screw threads 54 as shown, to enable a rubber or other soft, resilient material disc to be attached thereto for carrying sand paper, a polishing bonnet, or the like as will be readily appreciated by those having skill in this art. Further the shaft may be provided with a cross aperture 56 to enable a pin, or the like, not shown, to be engaged therewith for holding the output shaft 50 against rotation to enable the disc pad to be unthreaded therefrom and assembly of sanding disc by using a threaded nut and spanner wrench.

The inward end of the output shaft 50 is journaled in a bearing 58. The output gear 42 is provided with a central aperture 60 which is provided with a key slot 62. The output shaft 50 and the area within the ring gear 42 is provided with a milled slot 64 into which a woodruff key 66 is inserted. Behind the output gear 42, that is between the output gear 42 and the bearing 58, the shaft is provided with an annular groove and a snap ring 68 is installed which, as will be made clear hereafter, positions the output shaft 50 longitudinally.

The front face of the output gear 42 is provided with a central hub 70 that has a thrust face 72 which abuts a thrust face 74 of a combined sleeve and thrust bearing designated generally by the reference character 76 and which is of generally top-hat configuration comprising a generally cylindrical sleeve bearing portion 78 and a generally laterally or radially outwardly extending annular rim-like portion 80 providing a thrust bearing face generally perpendicular the axis of the sleeve bearing portion 76 which may, according to one aspect of the present invention, bear against the mating face 72 of the hub 70 of the bevel output ring gear 42 to provide axial positioning thereof.

Hence, the thrust face 74 of the bearing 76 limits outward movement of the gear 42. Inward movement of the gear 42 is limited by the snap ring 68. Outward movement of the snap ring 68 and, therefore, the output shaft 50 is limited by the gear 42. Inward movement of the snap ring 68 and, therefore, the output shaft 50, is limited by the bearing 58. Both the shaft 50 and gear 42 are therefor axially positioned.

Referring to the thrust face or surface 74 of the rim-like portion 70 as the "front" face, the rear face of the rim-like portion 80, in accordance with the present invention, is provided with a cam or ramp surface 82 which rises progressively relative the front or thrust bearing face 74 in a direction generally parallel the longitudinal axis of the sleeve bearing portion 78. Further, the rim portion 80 of the combined sleeve and thrust bearing 76 is provided with at least one generally radially extending slot 84 to enable engagement thereof by a spanner wrench, or the like, for rotational positioning of the bearing.

In accordance with the present invention, a bearing mount, designated generally by the reference character 86 is also provided connected with the housing half 12 for supporting the combined sleeve and thrust bearing 76 and comprises a semi-cylindrical seat in the housing half 12 of the clam-shell housing for receiving the sleeve portion 78 of the combined thrust and sleeve bearing 76. The combined thrust and sleeve bearing 76 is retained in position in the seat by a saddle strap 88 having a pair of generally opposed coplanar ears 90 adapted to be attached to the housing half 12 adjacent opposite sides of the semi-cylindrical seat, as by means of mounting screws 92. The saddle strap 88 further comprises a semi-cylindrical central portion 94 adapted to engage the sleeve bearing portion 78 generally opposite the semi-cylindrical seat to form therewith a generally cylindrical mounting for the sleeve bearing portion 78. Upon tightening of the mounting screws 92, the strap semi-cylindrical central portion 94 should so fit against the sleeve bearing portion 78 of the combined thrust and sleeve bearing 76 as to prevent it from rotating therewithin.

The generally semi-cylindrical portion 94 of the saddle strap 88 is provided with a cam or ramp surface 96 that mates with and is adapted to engage the cam or ramp surface 82 of the combined sleeve and thrust bearing 76 so that relative rotation of the bearing 76 beneath the saddle strap 88 will provide a camming action so as to move the bearing 76 and, therefore, the thrust face 74 thereof longitudinally relative the saddle strap 88 and bearing mount 86.

During assembly, a spanner wrench and appropriate tooling such as a pressure gauge or feeler gauge may be utilized to provide the desired positioning of the bevel ring gear 42 relative the mating pinion gear teeth 38 and, when properly positioned, tightening of the screws 92 holding the saddle strap 88 is then effective to lock the bearing 76 and the output shaft 50 in their desired orientation.

While the invention has been described, disclosed, illustrated and shown in terms of a preferred embodiment, or modification which it has assumed in practice and herein described, disclosed, illustrated and shown, such other embodiments or modifications as may be suggested to those having the benefit of the teaching herein are intended to be reserved especially as they fall within the scope and breadth of the claims here appended.

I claim:

1. In an electrically driven power tool having a right-angle output drive comprising a beveled pinion output ring gear slidable on an output shaft, a bearing and bearing mount comprising an adjustable combined sleeve and thrust bearing which may be adjusted during assembly for endwise positioning, in combination with such output shaft and beveled ring gear carried thereby to provide for adjustment of the gear in its mating relationship with an associated beveled pinion gear to provide smooth, quiet, and long life operation.

2. Combination of claim 1 wherein said combined sleeve and thrust bearing is of generally top-hat configuration comprising a generally cylindrical sleeve bearing portion and a generally laterally outwardly extending annular rim-like portion providing a thrust bearing face generally perpendicular the axis of the sleeve bearing portion to bear against a mating face of the hub of said beveled ring gear to provide axial positioning thereof.

3. Combination defined in claim 2 wherein the rear face of the rim-like portion is provided with at least one cam or ramp surface which rises progressively relative said thrust bearing face in a direction generally parallel the longitudinal axis of the sleeve bearing portion, in combination with a saddle strap having a pair of mounting ears and a semi-cylindrical central portion therebetween adapted to engage the sleeve bearing portion to form a mounting for the sleeve bearing portion, the strap so fitting against the sleeve portion of the bearing as to prevent it from rotating therewithin, said generally semi-cylindrical portion of the saddle strap being further provided with a cam or ramp surface that mates with and is adapted to engage the cam or ramp surface of the combined sleeve and thrust bearing so that relative rotation of the bearing beneath the strap will provide a camming action so as to move the bearing and, therefore, the thrust face thereof longitudinally relative the mounting strap.

4. Combination defined in claim 3 wherein the rim portion of the combined sleeve and thrust bearing is provided with at least one generally radially extending slot to enable engagement thereof, as by a spanner wrench for rotational positioning.

5. Bearing and bearing mount which provides an adjustable combined sleeve and thrust bearing which may be adjusted during assembly for endwise positioning and which, when used for example, in conjunction with a shaft and beveled ring gear carried thereby may be utilized to provide for adjustment of the gear in its mating relationship with an associated beveled pinion gear to provide smooth, quiet, and long life operation, comprising a combined sleeve and thrust bearing which is of generally top-hat configuration having a generally cylindrical sleeve bearing portion and a generally laterally outwardly extending annular rim-like portion providing a thrust bearing face generally perpendicular the axis of the sleeve bearing portion, the rear face of the rim-like portion being provided with a cam or ramp surface which rises progressively relative the front or thrust bearing face in a direction generally parallel the longitudinal axis of the sleeve bearing portion, the combined thrust and sleeve bearing being retained in position by a saddle strap having a pair of mounting ears and a semicylindrical central portion therebetween adapted to engage the sleeve bearing portion and so fit against the sleeve portion of the bearing as to prevent it from rotating therewithin and provided with a cam or ramp surface that mates with and is adapted to engage the cam or ramp surface of the combined sleeve and thrust bearing so that relative rotation of the bearing beneath the strap will provide a camming action so as to move the bearing and, therefore, the thrust face thereof longitudinally relative the mounting strap.

6. Bearing and bearing mount defined in claim 5 wherein the rim portion of the combined sleeve and thrust bearing is provided with at least one generally radially extending slots to enable engagement thereof, as by a spanner wrench for rotational positioning.

7. A bearing and bearing mount comprising an adjustable combined sleeve and thrust bearing which may be adjusted during assembly for endwise positioning which is of generally top-hat configuration having a generally cylindrical sleeve bearing portion and a generally laterally outwardly extending annular rim-like portion providing a thrust bearing face generally perpendicular the axis of the sleeve bearing portion, the rear face of the rim-like portion being provided with a cam or ramp surface which rises progressively relative the front or thrust bearing face in a direction generally parallel the longitudinal axis of the sleeve bearing portion together with a saddle strap having a semi-cylindrical central portion adapted to engage the sleeve bearing portion and so fit against the sleeve portion of the bearing as to prevent it from rotating therewithin and provided with a cam or ramp surface that mates with and is adapted to engage the cam or ramp surface of the combined sleeve and thrust bearing so that relative rotation of the bearing beneath the strap will provide a camming action so as to move the bearing and, therefore, the thrust face thereof longitudinally relative the mounting strap.

8. Bearing and bearing mount defined in claim 7 wherein the rim portion of the combined sleeve and thrust bearing is provided with at least one generally radially extending slot to enable engagement thereof, as by a spanner wrench for rotational positioning.

9. Combined sleeve and thrust bearing which is of generally top-hat configuration comprising a generally cylindrical sleeve bearing portion and a generally laterally outwardly extending annular rim-like portion providing a thrust bearing face generally perpendicular the axis of the sleeve bearing portion, the rear face of the rim-like portion being provided with a cam or ramp surface which rises progressively relative the front or thrust bearing face in a direction generally parallel the longitudinal axis of the sleeve bearing portion.

10. Bearing and bearing mount defined in claim 7 wherein the rim portion of the combined sleeve and thrust bearing is provided with at least one generally radially extending slot to enable engagement thereof, as by a spanner wrench for rotational positioning.

11. Saddle strap bearing mount portion having a semi-cylindrical central portion provided with a cam or ramp surface that mates with and is adapted to engage the cam or ramp surface of a combined sleeve and thrust bearing so that relative rotation of such bearing beneath the strap will provide a camming action so as to move such bearing and, therefore, the thrust face thereof longitudinally relative the mounting strap.

* * * * *